(12) United States Patent
Hsu et al.

(10) Patent No.: US 7,230,353 B2
(45) Date of Patent: Jun. 12, 2007

(54) CHARGING CIRCUIT IN UNINTERRUPTIBLE POWER SUPPLY SYSTEM

(75) Inventors: Chao-Yang Hsu, Taipei (TW); Hung-Chieh Lin, Taipei (TW)

(73) Assignee: Delta Electronics, Inc., Taoyuan Shien (TW)

( * ) Notice: Subject to any disclaimer, the term of this patent is extended or adjusted under 35 U.S.C. 154(b) by 482 days.

(21) Appl. No.: 10/820,496

(22) Filed: Apr. 8, 2004

(65) Prior Publication Data

US 2004/0201278 A1    Oct. 14, 2004

(30) Foreign Application Priority Data

Apr. 11, 2003    (TW) .............. 92108481 A

(51) Int. Cl.
*H02J 7/02* (2006.01)
*H02J 9/00* (2006.01)
*H02M 7/797* (2006.01)

(52) U.S. Cl. .................. 307/66; 307/72; 320/137; 363/98; 363/132

(58) Field of Classification Search .............. 307/46, 307/48, 67, 72, 80, 83, 85, 100; 320/130; 363/56.02

See application file for complete search history.

(56) References Cited

U.S. PATENT DOCUMENTS 5,302,858 A    4/1994  Folts ..................... 307/66

*Primary Examiner*—Robert L. Deberadinis

*Assistant Examiner*—Hal I. Kaplan

(74) *Attorney, Agent, or Firm*—Allen, Dyer, Doppelt, Milbrath & Gilchrist, P.A.

(57) ABSTRACT

A charging circuit in a back-up power system is provided. The charging circuit includes an output terminal electrically connected to a main power for providing an AC output voltage, a transformer having a secondary electrically connected to the output terminal, an energy storage and supply device providing a DC voltage, an inverter having an output electrically connected to a primary of the transformer and an input electrically connected to the energy storage and supply device and including four gate control switch devices to form a bridge switching device, a bridge rectifier having an input electrically connected to the output of the inverter in parallel, and a charging switch device electrically connected to an output of the bridge rectifier in parallel so as to charge the electrical energy storage and supply device through one of a conduction state and a cut-off state of said charging switch device.

12 Claims, 3 Drawing Sheets

CHARGING CIRCUIT IN UNINTERRUPTIBLE POWER SUPPLY SYSTEM

FIELD OF THE INVENTION

This invention relates to a charging circuit in an uninterruptible power supply system, and more particularly to a charging circuit in a line-interactive uninterruptible power supply system.

BACKGROUND OF THE INVENTION

For the line-interactive UPS (Uninterruptible Power Supply) system, there are generally three operation modes: on-line mode, back-up power mode and bypass mode. During the back-up mode, a battery will supply a voltage passing through an inverter to a load and the inverter will convert a DC voltage from the battery into an AC voltage. Please refer to FIG. 2, which illustrates a conventional charging circuit in the line-interactive UPS system. During a normal operation (on-line mode), a relay 101 or a switch is electrically conducted by a main power 102 electrically connected to output terminals 103 and 104 so as to directly output an AC voltage to a load (not shown). Then, when a controller detects an abnormal output of an AC line voltage, namely, the main power 102 is abnormal, the relay 101 or the switch will cut off the conduction thereof, and further, a battery 105 will provide a DC voltage, which can be converted into an AC voltage by an inverter 106. Therewith, the AC voltage is transformed by a transformer 107 for outputting.

During the normal operation mode, the line-interactive UPS will directly output the AC output voltage from the main power 102 while the main power 102 simultaneously charges the battery through the transformer 107 and the inverter 106. In addition, the line-interactive UPS utilizes leakage inductors of the transformer 107 to form a boost converter for charging the battery, whose details are disclosed in U.S. Pat. No. 5,302,858.

However, because in this circuit, the two switching devices Q1 and Q2 do not participate in the charging operation, the two switching devices Q3 and Q4 have to be controlled to be conductive so that the transformer 107 can be shorted for a specific duration for rapidly charging the leakage inductors of the transformer 107. When the conduction of the switching devices Q3 and Q4 is cut off, the leakage inductors will generate a maintaining current and also charge the battery 105 through anti-parallel diodes. Therefore, according to the description above, it is obvious that the conventional line-interactive UPS needs a complex circuit for realizing the purpose of current control.

In order to overcome the drawbacks in the prior art, a charging circuit in uninterruptible power supply system is provided.

SUMMARY OF THE INVENTION

In accordance with one aspect of the present invention, a charging circuit in a back-up power system includes an output terminal electrically connected to a main power for providing an AC output voltage, a transformer having a secondary electrically connected to the output terminal, an electrical energy storage and supply device providing a DC current, an inverter having an output electrically connected to a primary of the transformer and an input electrically connected to the electrical energy storage and supply device and comprising four gate control switch devices to form a bridge switching device, wherein the four gate control switch devices each respectively have an anti-parallel diode, a first diode having an anode electrically connected to one output terminal of the bridge switching device, a second diode having an anode electrically connected to the other output terminal of the bridge switch device, and a charging switch device having a first conducting terminal electrically connected to a common cathode of the first and the second diodes and a second conducting terminal electrically connected to a negative electrode of the electrical energy storage and supply device so as to charge the electrical energy storage and supply device through one of a conduction state and a cut-off state of the charging switch device.

Preferably, the electrical energy storage and supply device is a battery and the back-up power system is a line-interactive uninterruptible power supply system.

Moreover, each gate control switch device is a power MOSFET and the anti-parallel diode is an intrinsic anti-parallel diode of the power MOSFET.

Furthermore, the charging circuit further includes a fixed switch electrically connected between the main power and the output terminal for determining one of a conduction state and a cut-off state therebetween according to a control signal.

In addition, the back-up power system further includes a current limiting resistor electrically connected with the charging switch device in series.

In accordance with another aspect of the present invention, a charging circuit in a back-up power system includes an output terminal electrically connected to a main power for providing therefrom an AC output voltage, a transformer having a secondary electrically connected to the output terminal, an electrical energy storage and supply device providing a DC voltage, an inverter having an output electrically connected to a primary of the transformer and an input electrically connected to the electrical energy storage and supply device and comprising four gate control switch devices to form a bridge switching device, wherein the gate control switch devices respectively have an anti-parallel diode, a bridge rectifier having an input electrically connected to the output of the inverter in parallel, and a charging switch device electrically connected to an output of the bridge rectifier in parallel so as to charge the electrical energy storage and supply device through one of a conduction state and a cut-off state of the charging switch device.

Preferably, the electrical energy storage and supply device is a battery and the back-up power system is a line-interactive uninterruptible power supply system.

Meanwhile, each gate control switch device is a power MOSFET and the anti-parallel diode is an intrinsic anti-parallel diode of the power MOSFET.

Furthermore, the charging circuit further includes a fixed switch electrically connected between the main power and the output terminal for determining one of a conduction state and a cut-off state therebetween according to a control signal.

In addition, the back-up power system further includes a current limiting resistor electrically connected to the charge switch device in series.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

One object of the present invention is to provide a charging circuit in a line-interactive UPS system which utilizes only one single control switch to realize a charge for a battery.

Another object of the present invention is to provide a charging circuit in a line-interactive UPS system which utilizes one single switch to separate a charging path from an inverter path of the charging circuit in the UPS system and also employs a current limiting resistor for current control.

Figure 1:
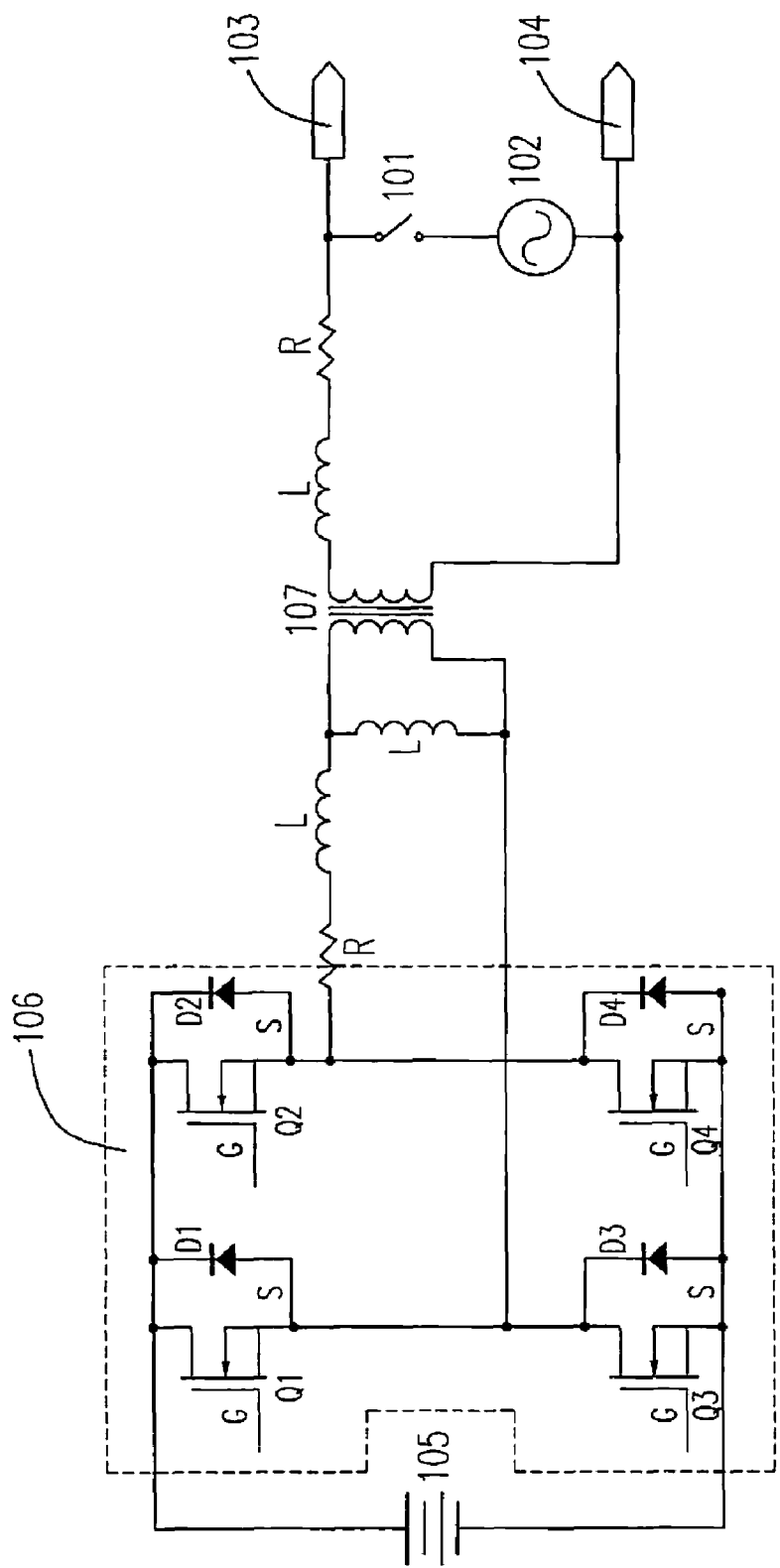
FIG. 1 is a schematic view showing a charging circuit of a conventional line-interactive UPS (Uninterruptible Power Supply) system.
Figure 2:
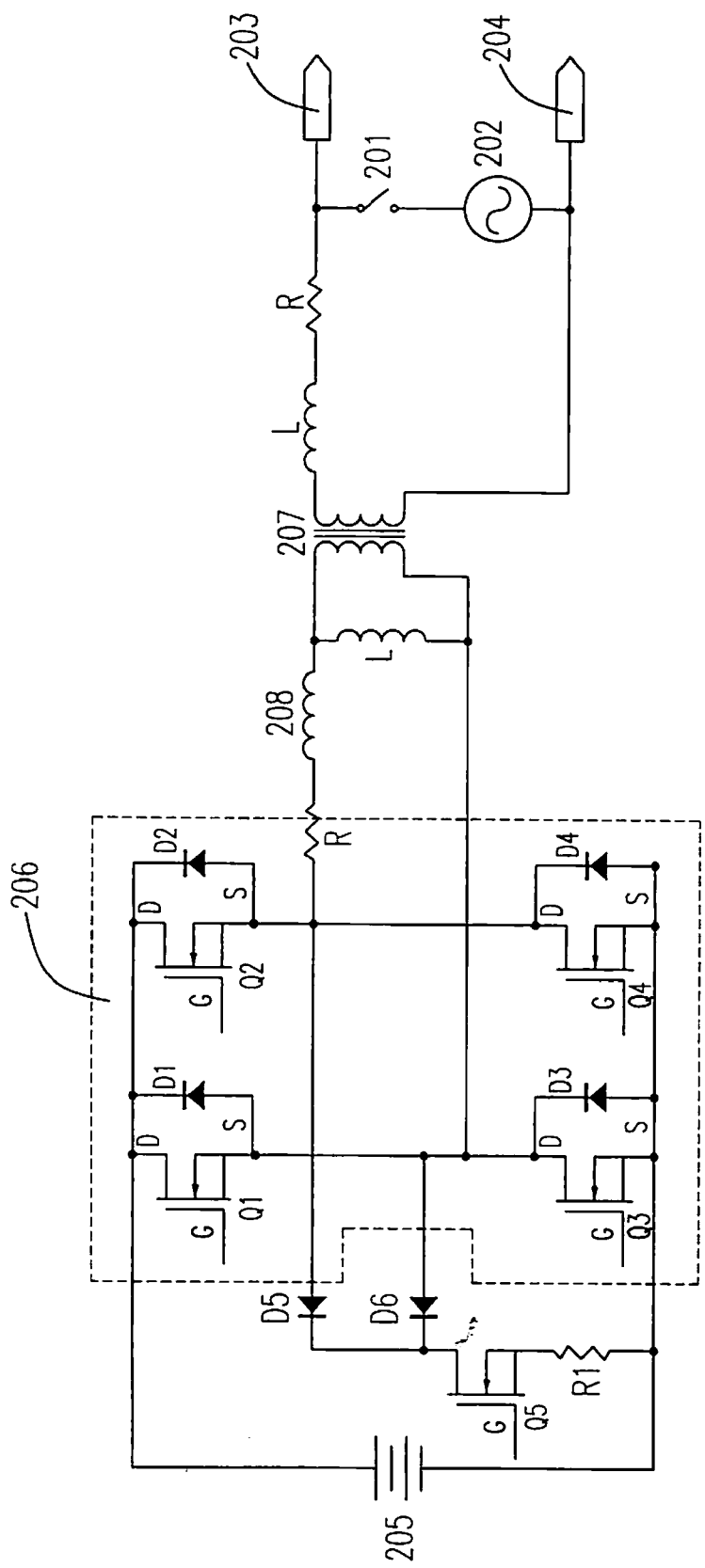
FIG. 2 is a schematic view showing a charging circuit of a line-interactive UPS system in a first preferred embodiment according to the present invention.

Now, please refer to FIG. 2, which illustrates a schematic view of a charging circuit of a line-interactive UPS (Uninterruptible Power Supply) system in a first preferred embodiment according to the present invention. As shown in FIG. 2, a charging circuit in a line-interactive UPS system includes output terminals 203 and 204, a transformer 207, a battery 205, an inverter 206, a first diode D5, a second diode D6 and a charging switch device Q5. The output terminals 203 and 204 are electrically connected to a main power 202 for providing an AC output voltage, a secondary of the transformer 207 is electrically connected to the output terminals 203 and 204 and the battery 205 is employed to provide a DC voltage. Moreover, an output of the inverter 206 is electrically connected to a primary of the transformer 207 and an input thereof is electrically connected to the battery 205, and the inverter 206 includes four gate control switch devices Q1, Q2, Q3, Q4 to form a bridge switching device, wherein the four gate control switch devices Q1, Q2, Q3, Q4 respectively have an anti-parallel diode D1, D2, D3, D4. Furthermore, an anode of the first diode D5 is electrically connected to one output of the bridge switching device and an anode of a second diode D6 is electrically connected to the other output of the bridge switch device. Then, the drain of the charging switch device Q5 is electrically connected to a common cathode of the first and the second diodes D5, D6 and the source thereof is electrically connected to a negative electrode of the battery 205 so that the charge of the battery 205 can be controlled through one of a conduction state and a cut-off state of the charging switch device Q5.

Meanwhile, each of the gate control switch device can be a power MOSFET and each of the anti-parallel diode can be an intrinsic anti-parallel diode of the power MOSFET. And, the charging circuit in the line-interactive UPS can further include a fixed switch 201 to be connected between the main power 202 and the output terminal 203 for determining a conduction state or a cut-off state therebetween according to a control signal.

Also, the charging circuit in the line-interactive UPS system further includes a current limiting resistor R1 electrically connected with the charging switch device Q5 in series.

When the line-interactive UPS system is normally provided by a utility electricity, the operation principle of the charging circuit is described as follows.

When the charging switch device Q5 is conductive during a positive half cycle of the main power 202, the first diode D5 and the anti-parallel diode D3 are conductive, thus shorting the transformer 207 for a specific duration so as to charge the leakage inductor 208 of the transformer 207. When the conduction of the charging switch device Q5 is cut off, the leakage inductor 208 will generate a current for maintaining a continuous current flow to charge the battery 205 through the anti-parallel diodes D2, D3.

When the charging switch device Q5 is conductive during a negative half cycle of the main power 202, the second diode D6 and the anti-parallel diode D4 are conductive thus shorting the transformer 207 for a specific duration so as to charge the leakage inductor 208 of the transformer 207. When the conduction of the charging switch device Q5 is cut off, the leakage inductor 208 will generate a current for maintaining a continuous current flow to charge the battery 205 through the anti-parallel diodes D1, D4.

In this preferred embodiment, a value of the current limiting resistor R1 can be easily selected to limit the magnitude of the charging current.

Figure 3:
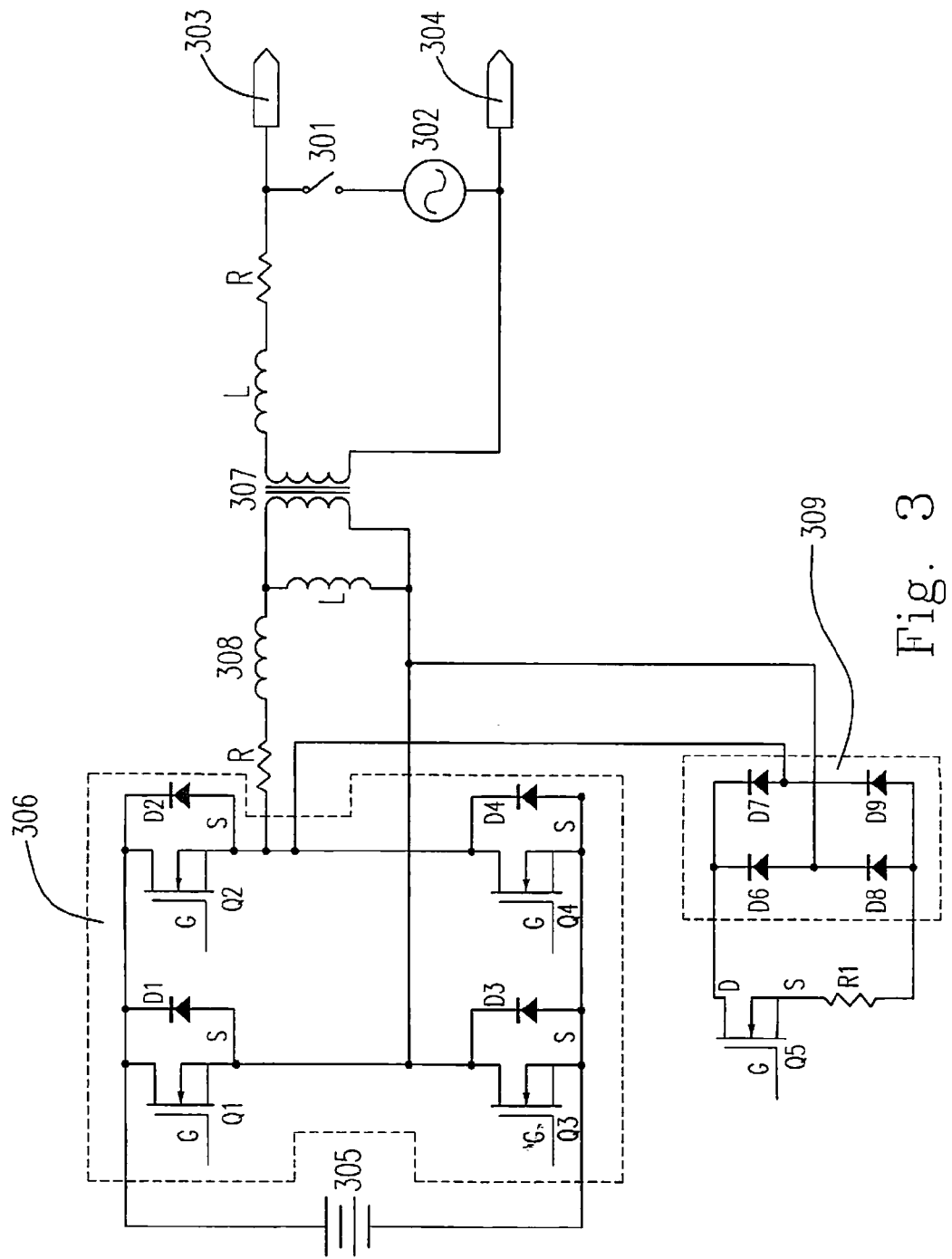
FIG. 3 is a schematic view showing a charging circuit of a line-interactive UPS system in a second preferred embodiment according to the present invention.

Please refer to FIG. 3, which illustrates a schematic view of a charging circuit of a line-interactive UPS (Uninterruptible Power Supply) system in a second preferred embodiment according to the present invention. As shown in FIG. 3, a charging circuit in a line-interactive UPS system includes output terminals 303 and 304, a transformer 307, a battery 305, an inverter 306, a bridge rectifier 309 and a charging switch device Q5. The output terminals 303 and 304 are electrically connected to a main power 302 for providing an AC output voltage, a secondary of the transformer 307 is electrically connected to the output terminals 303 and 304 and the battery 305 is employed to provide a DC voltage. Moreover, an output of the inverter 306 is electrically connected to a primary of the transformer 307 and an input thereof is electrically connected to the battery 305, and the inverter 306 includes four gate control switch devices Q1, Q2, Q3, Q4 to form a bridge switching device, wherein the four gate control switch devices Q1, Q2, Q3, Q4 respectively have an anti-parallel diode D1, D2, D3, D4. Furthermore, an input of the bridge rectifier 309 is electrically connected to the output of the inverter 306 in parallel, and the charging switch device Q5 is electrically connected to an output of the bridge rectifier 309 in parallel so that the charge of the battery 305 can be controlled through a conduction and a cut-off of the charging switch device Q5. Meanwhile, each gate control switch device Q1, Q2, Q3, Q4 can be a power MOSFET and each anti-parallel diode D1, D2, D3, D4 can be an intrinsic anti-parallel diode of the power MOSFET. And, the charging circuit in the line-interactive UPS system can further include a fixed switch 301 to be connected between the main power 302 and the output terminal 303 for determining a conduction state or a cut-off state therebetween according to a control signal.

When the line-interactive UPS system is normally provided by a utility electricity, the operation principle of the charging circuit is described as follows.

When the charging switch device Q5 is conductive during a positive half cycle of the main power 302, the diodes D7 and D8 of the bridge rectifier 309 are conductive, thus shorting the transformer 307 for a specific duration so as to charge the leakage inductor 308 of the transformer 307. When the conduction of the charging switch device Q5 is cut off, the leakage inductor 308 will generate a current for maintaining a continuous current flow to charge the battery 305 through the anti-parallel diodes D2, D3.

When the charging switch device Q5 is conductive during a negative half cycle of the main power 302, the diodes D6 and D9 of the bridge rectifier 309 are conductive, thus shorting the transformer 307 for a specific duration so as to charge the leakage inductor 308 of the transformer 307. When the conduction of the charging switch device Q5 is cut off, the leakage inductor 308 will generate a current for maintaining a continuous current flow to charge the battery 305 through the anti-parallel diodes D1, D4.

In this preferred embodiment, a current limiting resistor R1 is electrically connected with the charging switch device Q5 in series and a value of the current limiting resistor R1 can be easily designed to limit the magnitude of the charging current.

In view of the aforesaid, the present invention provides a charging circuit in a line-interactive uninterruptible power supply system. The charging circuit according to the present invention utilizes only one single control switch for realizing a charge of a battery in the line-interactive UPS system. Moreover, the charging circuit according to the present invention simply employs the single switch to separate a charging path from an inverter path and also utilizes a current limiting resistor to control the current. Consequently, the present invention is really a novel and progressive creation and conforms to the demand of the industry.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A charging circuit in a back-up power system, comprising:
   an output terminal electrically connected to a main power for providing an AC output voltage;
   a transformer having a secondary electrically connected to said output terminal;
   an electrical energy storage and supply device providing a DC current;
   an inverter having an output electrically connected to a primary of said transformer and an input electrically connected to said electrical energy storage and supply device and comprising four gate control switch devices to form a bridge switching device, wherein said four gate control switch devices respectively have an anti-parallel diode;
   a first diode having an anode electrically connected to one output terminal of said bridge switching device;
   a second diode having an anode electrically connected to the other output terminal of said bridge switch device; and
   a charging switch device having a first conducting terminal electrically connected to a common cathode of said first and said second diodes and a second conducting terminal electrically connected to a negative electrode of said electrical energy storage and supply device so as to charge said electrical energy storage and supply device through a conduction state and a cut-off state of said charging switch device.

2. The charging circuit according to claim 1, wherein said electrical energy storage and supply device is a battery.

3. The charging circuit according to claim 1, wherein each said gate control switch device is a power MOSFET and said anti-parallel diode is an intrinsic anti-parallel diode of said power MOSFET.

4. The charging circuit according to claim 1 further comprising a fixed switch electrically connected between said main power and said output terminal for determining one of a conduction state and a cut-off state therebetween according to a control signal.

5. The charging circuit according to claim 1, wherein said back-up power system is a line-interactive uninterruptible power supply system.

6. The charging circuit according to claim 1, wherein said back-up power system further comprises a current limiting resistor electrically connected with said charging switch device in series.

7. A charging circuit in a back-up power system, comprising:
   an output terminal electrically connected to a main power for providing therefrom an AC output voltage;
   a transformer having a secondary electrically connected to said output terminal;
   an electrical energy storage and supply device providing a DC voltage;
   an inverter having an output electrically connected to a primary of said transformer and an input electrically connected to said electrical energy storage and supply device and comprising four gate control switch devices to form a bridge switching device, wherein said gate control switch devices respectively have an anti-parallel diode;
   a bridge rectifier having an input electrically connected to said output of said inverter in parallel; and
   a charging switch device electrically connected to an output of said bridge rectifier in parallel so as to charge said electrical energy storage and supply device through one of a conduction state and a cut-off state of said charging switch device.

8. The charging circuit according to claim 7, wherein said electrical energy storage and supply device is a battery.

9. The charging circuit according to claim 7, wherein each said gate control switch device is a power MOSFET and said anti-parallel diode is an intrinsic anti-parallel diode of said power MOSFET.

10. The charging circuit according to claim 7 further comprising a fixed switch electrically connected between said main power and said output terminal for determining one of a conduction state and a cut-off state therebetween according to a control signal.

11. The charging circuit according to claim 7, wherein said back-up power system is a line-interactive uninterruptible power supply system.

12. The charging circuit according to claim 7, wherein said back-up power system further comprises a current limiting resistor electrically connected to said charge switch device in series.

* * * * *